Jan. 24, 1950     O. C. RITZ-WOLLER     2,495,347
MIRROR CONSTRUCTION HAVING
A RESILIENT SECURING BAND
Filed July 22, 1947
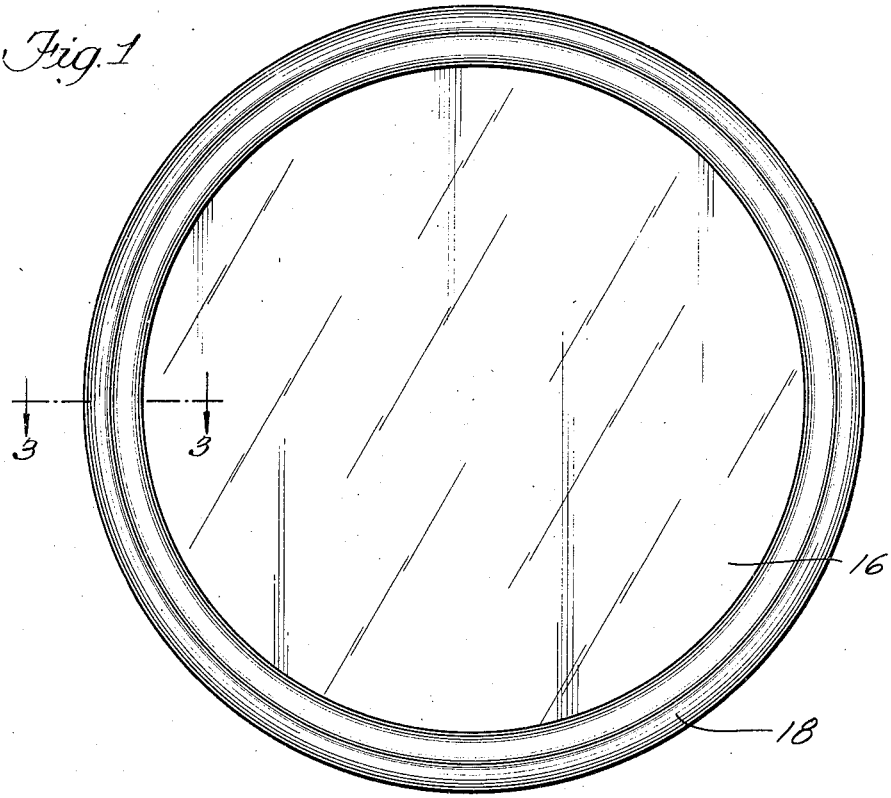
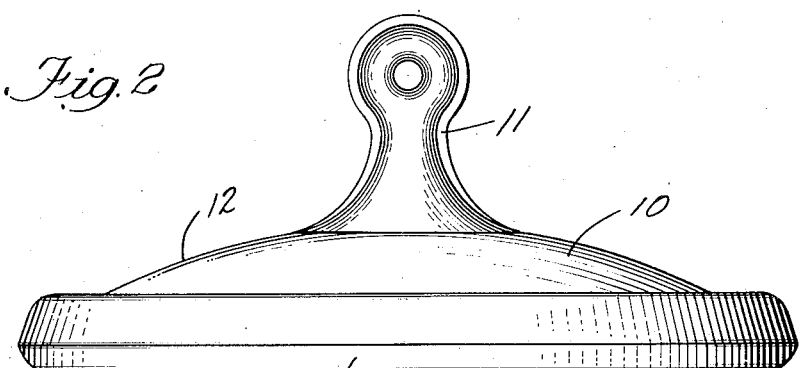
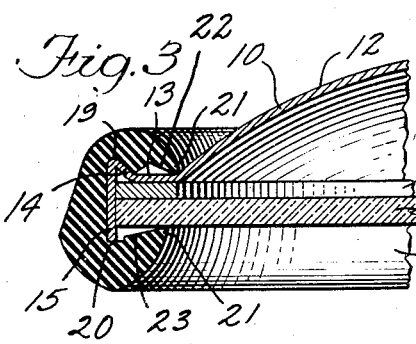
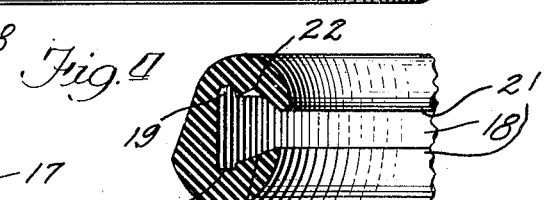
Inventor:
Oliver C. Ritz-Woller.
By: Bair & Freeman
Attorneys.

Patented Jan. 24, 1950

2,495,347

UNITED STATES PATENT OFFICE 2,495,347

MIRROR CONSTRUCTION HAVING A RESILIENT SECURING BAND

Oliver C. Ritz-Woller, Dallas, Tex.

Application July 22, 1947, Serial No. 762,682

3 Claims. (Cl. 88—96)

This invention relates to truck mirrors and the like and particularly to rear vision type mirrors.

It is an object of the invention to provide an improved form and arrangement of parts by which two members having their outer edges oppositely disposed may be secured together with respect to each other and by which the members may be protected from damage by a blow or by pressure otherwise thereon.

It is another object of the invention to reduce the cost and number of parts in a rear vision truck mirror.

It is also an object of the invention to provide improved means for effecting gripping by the resilient band of rubber or similar material which surrounds the periphery of the mirror and also to provide such a resilient band which is readily detachable for replacing a mirror in case of breakage.

It is a further object of the invention to provide a truck mirror in which the body or casing portion is formed of one piece of material without welding.

With these and other objects in view, the invention consists in the construction, arrangement and combination of the various parts of my device, whereby the objects contemplated are attained, as hereinafter more fully set forth, pointed out in the claims and illustrated in the accompanying drawings, wherein:

Figure 1 is a front face view of the improved device;

Figure 2 is a side elevational view of the improved truck mirror;

Figure 3 is an enlarged partial sectional view taken on line 3—3 of Figure 1; and Figure 4 is an enlarged partial sectional view of the resilient band prior to its disposal on the completed device.

Referring specifically to the drawing for a detailed description of the invention, numeral 10 designates generally a casing member, preferably made of sheet metal, formed in the general shape of a dish and being provided with a mounting pin 11 at the rear thereof for mounting in any suitable manner to an arm which is secured to the truck frame. The casing member 10 may also be formed of a suitable hard plastic material, if desired. As best shown in Figure 3, a concave portion 12 of the casing 10 has a flat portion 13 formed adjacent its periphery. The sheet metal is then bent upwardly to form an upper flange portion 14 extending outwardly from the flat portion 13 and the metal is then bent downwardly to form a lower flange portion 15. Obviously, the entire casing is formed of a single piece of material which is readily formed by stamping or molding.

A mirror 16 is provided and is formed from a sheet of plate glass which is silvered on the back. A gasket 17, preferably made of cork, is inserted between the mirror 16 and the flat portion 13 of the casing 10. The cork gasket 17 cushions the glass mirror and prevents glass to metal contact.

A resilient band generally indicated 18, which is preferably made of rubber or similar material so as to be capable of being stretched for mounting it about the members 10 and 16, is provided with an upper internal groove 19 and a lower internal groove 20. As will be apparent from Figure 3, the upper flange 14 of the casing 10 extends into the groove 19 and the lower flange 15 of the casing 10 extends into the groove 20. The resilient band 18 is provided with opposed lip portions 21, one of which engages the casing approximately at the point where the concave portion 12 is bent to form the flat portion 13, and the other of which engages the mirror 16. The entire assembly is thereby held together by the resilient band 18, since the casing 10, the mirror 16 and the gasket 17 are pressed together by the resilient band. It will be noted from an examination of Figure 4 that the lips 21 are closer together than they are in Figure 3 when the resilient band is assembled on the completed device. In order to increase the gripping action, the resilient band is provided with a V-shaped groove 22 between the groove 19 and the upper lip 21 and with an angular wall 23 between the lower groove and the lower lip 21.

From the foregoing it will be obvious that I have provided an improved assembly for truck mirrors and the like in which a resilient band retains the parts together and prevents damage to the mirror, which resilient band is readily removable for replacement of the mirror, if necessary. Furthermore, the casing member is formed of a single stamping or molding and is very inexpensive to fabricate, because no difficult forming operations or welding are required.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a mirror construction comprising a casing having front and rear face portions thereon, a mirror positioned across the front face portion of the casing, flange means carried by the outer marginal portion of the casing and having portions extending in both directions beyond the respective face portions, and a resilient band embracing the marginal portions of said casing and mirror, said band having inwardly facing grooves adapted to grip opposite edges of said flange means and having inwardly facing lips, one engaging the rear surface of the casing and the other engaging the mirror to firmly grip and hold the casing and mirror in assembled relation; the improvement wherein said casing and flange means are formed as a unit from a single piece of sheet material, and wherein the outer marginal portion of the casing terminates in a rearwardly bent portion which merges into a forwardly extending portion, providing flanges projecting in opposite directions beyond the respective face portions of the casing.

2. In a mirror construction comprising a casing having front and rear face portions thereon, a mirror positioned across the front face portion of the casing, flange means carried by the outer marginal portion of the casing and having portions extending in both directions beyond the respective face portions, and a resilient band embracing the marginal portions of said casing and mirror, said band having inwardly facing grooves adapted to grip opposite edges of said flange means and having inwardly facing lips, one engaging the rear surface of the casing and the other engaging the mirror to firmly grip and hold the casing and mirror in assembled relation; the improvement wherein said casing and flange means are formed as a unit from a single piece of sheet material, and wherein the outer marginal portion of the casing terminates in a rearwardly bent portion which merges into a forwardly extending portion, providing a pair of flanges, one projecting rearwardly beyond the rear face of the casing, and the other projecting forwardly beyond the mirror.

3. In a mirror construction comprising a casing having front and rear face portions thereon, a mirror positioned across the front face portion of the casing, flange means carried by the outer marginal portion of the casing and having portions extending in both directions beyond the respective face portions, and a resilient band embracing the marginal portions of said casing and mirror, said band having inwardly facing grooves adapted to grip opposite edges of said flange means and having inwardly facing lips, one engaging the rear surface of the casing and the other engaging the mirror to firmly grip and hold the casing and mirror in assembled relation; the improvement wherein said casing and flange means are formed as a unit from a single piece of sheet material, and wherein the outer marginal portion of the casing is formed with a flat portion, extending into a sharply bent, rearwardly extending portion, the outer edge portion of which merges into a reversely bent, forwardly extending portion, providing a pair of flanges, one terminating rearwardly of the rear face of the casing and the other terminating forwardly of the mirror.

OLIVER C. RITZ-WOLLER.

REFERENCES CITED

The following references are of record in the file of this patent:

UNITED STATES PATENTS

| Number | Name | Date |
|---|---|---|
| 1,492,849 | Hubbard | May 6, 1924 |
| 1,723,307 | Sipe | Aug. 6, 1929 |
| 2,111,641 | Ritz-Woller | May 22, 1938 |